Patented May 6, 1947

2,420,244

UNITED STATES PATENT OFFICE 2,420,244

RECOVERY OF NAPHTHENIC ACIDS

Lawrence M. Henderson, Winnetka, and George W. Ayers, Jr., Chicago, Ill., assignors to The Pure Oil Company, Chicago, Ill., a corporation of Ohio No Drawing. Application December 26, 1942, Serial No. 470,301

2 Claims. (Cl. 260—514)

This invention relates to the process of preparing petroleum naphthenic acids.

It is common practice to wash crude oils or petroleum distillates with aqueous caustic alkali solutions and to separate from the resultant solution by acidification thereof the naphthenic acids contained therein.

The importance of naphthenic acids has increased due to the fungicidal properties of the copper salts thereof, making these salts extremely useful for coating ship bottoms. The naphthenates are also extremely useful in preparing driers for paints.

Alkali washing is commonly resorted to in refineries for washing gasoline, kerosene and other distillates to remove therefrom acidic constituents. The used or spent alkali is frequently disposed of without any attempt to recover therefrom the acidic constituents. In those operations where regeneration and recirculation of used alkali solution is practised naphthenic acid soaps tend to accumulate in the alkali solution, thus making these solutions valuable sources of naphthenic acids.

We have discovered that by chilling aqueous caustic alkali solutions containing naphthenic acid soaps, the naphthenic acid soaps will separate as a supernatant waxy solid which can be skimmed from the liquid or which can be separated from the liquid merely by permitting the liquid to drain from the tank. We have further discovered that the extent of cooling required depends primarily on (1) the free alkali metal hydroxide content of the solution, and (2) the particular alkali used, (3) the content of solventizer in the alkali solution, and (4) the particular naphthenic acids present. Thus, where it is desired to dispose of a used or spent alkali, the naphthenic acid soaps may be separated by chilling to the temperature required for that particular solution. However, if it is desired to recirculate the caustic alkali solution after separation of the naphthenic acids for further use and it is found necessary to add additional caustic to the solution to bring the free alkali metal hydroxide up to required strength it may be desirable to add the additional caustic alkali prior to chilling the solution, thereby avoiding chilling to as low a temperature as would be required in the absence of the added caustic alkali.

One of the objects of the invention is to provide a method for removing naphthenic acid soaps from alkali solutions.

Another object of the invention is to provide a method of recovering naphthenic acid soaps from alkali solutions.

A further object of the invention is to provide a simple method for removing naphthenic acids from petroleum oils and for recovering the acids so removed.

In accordance with our invention hydrocarbon oil such as kerosene or other distillate is washed with aqueous caustic alkali solution as for example a solution containing from approximately 5 to 20% by weight of free sodium or potassium hydroxide. Washing may be done by any conventional method but preferably by counter-current contact between the oil and alkali solution. The resulting alkali solution may be chilled to the required temperature to cause separation of the naphthenic acid soaps prior to recirculation of the solution for further use, either with or without regeneration by air blowing and/or steam stripping; or the alkali solution may be recirculated for use a plurality of times in order to allow a larger amount of naphthenic acid soaps to accumulate in the alkali solution prior to separation thereof by appropriate cooling and decanting or skimming.

The point at which the naphthenic acid salts can be separated from the aqueous alkali solution is roughly a straight linear function of the alkali concentration and the temperature between the normal freezing and boiling temperatures of water.

As the concentration of the free metal hydroxide in the solution increases, the temperature to which it is necessary to cool to separate the naphthenic acid salts is raised. Likewise, as the concentration of free alkali metal hydroxide decreases, the temperature necessary to separate the naphthenic acid salts becomes lower. It is therefore possible to predict the temperature to which it is necessary to cool any particular solution, whose free alkali metal hydroxide concentration is known, in order to separate out the naphthenic acid salts. If the alkali metal hydroxide concentration of a solution is unknown, it is necessary to cool down to 32° F. in the case of sodium hydroxide and below 32° F. in the case of potassium hydroxide solution in order to determine whether substantially all the naphthenic acid salts have separated.

Although the relationship between free alkali metal hydroxide and temperature at which the naphthenic acid salts will separate differs somewhat for each alkali metal hydroxide the linear function relationship between free alkali metal hydroxide concentration and temperature holds for each particular alkali metal hydroxide and naphthenate. Thus, once having determined the temperature to which it is necessary to cool a particular alkali solution when treating any particular fraction from a given oil, the temperature so determined can be relied upon in further operations to separate the naphthenates from the alkali solution when treating a corresponding fraction.

The following example will demonstrate the effectiveness of chilling in separating naphthenic acids from used caustic alkali solutions. Spent caustic soda solution from the treatment of kerosene with an aqueous caustic alkali solution originally containing approximately 10% by weight of caustic soda was subjected to cooling. The spent caustic soda solution after treatment of the kerosene from Van Zandt County, Texas crude oil contained approximately 8% by weight of free sodium hydroxide and 2.6% by volume of petroleum acids which were mainly naphthenic acids. The solution was cooled to approximately 55° F., at which temperature approximately 20 pounds of a supernatant waxy solid resembling fiber grease separated out. This solid contained 52.4% by weight of naphthenic acid in the form of the sodium salts. The remaining caustic soda solution contained only .10% of petroleum acids. The recovered naphthenic acids had an average molecular weight of 310.

In order to show the combined effect of temperature and free metal hydroxide concentration, a series of solutions was prepared with different amounts of naphthenic acid salts and free alkali hydroxide and the temperature at which the naphthenic acid salts separated out was determined. The naphthenates used in these solutions were obtained from the treatment of kerosene from East Texas crude oil with aqueous caustic soda solution. The following table gives the results obtained. In preparing solutions 1–8, the naphthenates used were obtained by cooling the caustic soda solution from treatment of kerosene from East Texas crude. In solutions 9–14 the salts used were obtained by cooling the same caustic soda solution, acidifying with concentrated sulfuric acid and washing the resulting acids with water. The neutralization number of the resulting acids was determined and sufficient sodium or potassium hydroxide solution added thereto to give the desired free alkali hydroxide concentration.

| Sol. No. | Composition of Solution | Temp. (° F.) at which separation of Na or K salts (mainly naphthenates) occurs |
|---|---|---|
| 1 | 15% NaOH<br>3% Na salts (mainly naphthenate).<br>82% Water. | 125–130. |
| 2 | 15% NaOH<br>6% Na salts (mainly naphthenate).<br>79% Water. | 130–140. |
| 3 | 10% NaOH<br>3% Na salts (mainly naphthenate).<br>87% Water. | 63. |
| 4 | 10% NaOH<br>6% Na salts (mainly naphthenate).<br>84% Water. | 65. |
| 5 | 5% NaOH<br>3% Na salts (mainly naphthenate).<br>92% Water. | partly separates at 212; remainder at approx. 32. |
| 6 | 5% NaOH<br>6% Na salts (mainly naphthenate).<br>89% Water. | approx. 32. |
| 7 | 0% NaOH<br>3% Na salts (mainly naphthenate).<br>97% Water. | approx. 32. |
| 8 | 0% NaOH<br>6% Na salts (mainly naphthenate).<br>94% Water. | approx. 32. |
| 9 | 10% NaOH<br>5.4% Na naphthenates<br>84.6% Water. | substantially complete at 50. |
| 10 | 10% NaOH<br>5.4% Na naphthenates<br>5% M. P. Cresol.<br>79.6% Water. | not complete at 20. |
| 11 | 10% NaOH<br>5.4% Na naphthenates<br>6.3% Na isobutyrate<br>78.3% Water. | substantially complete at 50. |
| 12 | 14% KOH<br>5.9% K naphthenates<br>80.1% Water. | below 32. |
| 13 | 21% KOH<br>5.9% K naphthenates<br>73.1% Water. | almost complete at 68–86; complete at 54. |
| 14 | 31% KOH<br>5.9% K naphthenates<br>63.1% Water. | boiling point of solution (248° F.). |

From an examination of the data for the solutions tabulated above, it is apparent that potassium hydroxide solutions require lower temperatures for separation of the naphthenates therefrom than are required for sodium hydroxide solutions of corresponding alkalinity.

Although substantially all the naphthenic acids may be separated in accordance with my invention, the products so separated may contain impurities. The impure naphthenic acids may be purified if found necessary by known methods such as by acidification of the product followed by extraction with aniline or orthotoluidine; or the naphthenic acids after acidification may be taken up in a solution of alcoholic alkali from which they are extracted with petroleum ether. The naphthenic acids, either in the form of sodium salts as recovered from the spent alkali or after neutralization and/or purification may be used for various purposes such as in the preparation of demulsifying agents, detergents, soaps, greases, paint and varnish driers, paints, protective coatings and insecticidal and fungicidal sprays.

The invention is not applicable to solutions containing solventizers such as disclosed in Henderson et al Patent No. 2,297,621 except to the extent that it is possible to separate from such solution naphthenic acid salt accumulated in excess of the amount which the solventizer can hold in solution. This is demonstrated by solution 10 to which was added the solventizer meta-para cresol. The complete separation of the naphthenates could not be effected even at 20° F. On the other hand the presence of well known solubility promoters such as sodium isobutyrate does not affect the separation of the naphthenic acids as demonstrated by solution 11. The separation of the naphthenic acids took place at the same temperature with and without the isobutyrate.

It will be seen that we have discovered a simple method for separating naphthenic acids from caustic alkali solutions containing them without the necessity of neutralizing the entire alkali solution, merely by regulating the temperature of the solution and/or concentration of the free alkali metal hydroxide contained thereof.

We claim:

1. The method of separating naphthenic acid soaps from aqueous sodium hydroxide solution containing at least 10% by weight of free sodium hydroxide and substantially free from solventizers comprising cooling the solution to a temperature not below approximately 50° F. at which said naphthenic acid soaps separate from said solution as a supernatant solid and separating the solid from the solution.

2. Method in accordance with claim 1 in which the solution is cooled to approximately 50° F.

LAWRENCE M. HENDERSON.
GEORGE W. AYERS, Jr.

REFERENCES CITED

The following references are of record in the file of this patent:

UNITED STATES PATENTS

| Number | Name | Date |
| --- | --- | --- |
| 1,694,461 | Alleman | Dec. 11, 1928 |
| 1,792,113 | Mugdan et al. | Feb. 10, 1931 |
| 2,220,013 | Bruun | Oct. 29, 1940 |
| 2,136,608 | Blount | Nov. 15, 1938 |